(12) United States Patent
Lin et al.

(10) Patent No.: US 7,820,940 B2
(45) Date of Patent: Oct. 26, 2010

(54) LASER ENGRAVING MECHANISM AND ENGRAVING METHOD OF USING THE SAME

(75) Inventors: Chih-Pen Lin, Taipei Hsien (TW); Hung-Chang Lee, Taipei Hsien (TW); Yu-Chuan Chen, Shenzhen (CN); Chuang Liu, Shenzhen (CN); Kai Yin, Shenzhen (CN)

(73) Assignees: Shenzhen Futaihong Precision Industry Co., Ltd., ShenZhen, Guangdong Province (CN); FIH (Hong Fong) Limited, Kowloon (HK)

( * ) Notice: Subject to any disclaimer, the term of this patent is extended or adjusted under 35 U.S.C. 154(b) by 801 days.

(21) Appl. No.: 11/740,853

(22) Filed: Apr. 26, 2007

(65) Prior Publication Data

US 2008/0156778 A1    Jul. 3, 2008

(30) Foreign Application Priority Data

Dec. 29, 2006   (CN) ......................... 200610064625

(51) Int. Cl.
*B23K 26/38* (2006.01)
*B23K 26/03* (2006.01)
(52) U.S. Cl. .............................. 219/121.68; 219/121.69
(58) Field of Classification Search ............ 219/121.68, 219/121.69, 121.83; 700/166; 348/95
See application file for complete search history.

(56) References Cited

U.S. PATENT DOCUMENTS

| | | | | |
|---|---|---|---|---|
| 4,918,284 A | * | 4/1990 | Weisz ..................... | 219/121.69 |
| 4,918,611 A | * | 4/1990 | Shyu et al. ............. | 219/121.67 |
| 4,970,600 A | * | 11/1990 | Garnier et al. ......... | 219/121.68 |
| 5,304,773 A | * | 4/1994 | Kilian et al. ........... | 219/121.83 |
| 2003/0217809 A1 | * | 11/2003 | Morishige ................ | 156/345.5 |

FOREIGN PATENT DOCUMENTS

| | | | |
|---|---|---|---|
| CN | 1640607A A | | 7/2005 |
| DE | 10157983 A1 | * | 6/2003 |
| FR | 2660083 A | * | 9/1991 |
| JP | 1-205959 A | * | 8/1989 |
| JP | 3-35892 A | * | 2/1991 |
| JP | 05-212569 A | * | 8/1993 |
| JP | 8-285525 A | * | 11/1996 |
| JP | 10-301052 A | * | 11/1998 |
| JP | 2002-120079 A | * | 4/2002 |
| JP | 2002-346781 A | * | 12/2002 |
| JP | 2003-233424 A | * | 8/2003 |

* cited by examiner

*Primary Examiner*—Geoffrey S Evans
(74) *Attorney, Agent, or Firm*—Jeffrey T. Knapp

(57) ABSTRACT

A laser engraving mechanism (100) for engraving a workpiece (16) includes an image receiver (12), an image processor (13), an engraving controller (14), and a laser emitting member (15). The image receiver screens the workpiece to form an image of the workpiece and transforms the image of the workpiece into electronic image signals. The image processor is connected to the image receiver. The image processor saves a group of datum coordinates, forms a group of engraving coordinates according to the electronic image signals, and compares the engraving coordinates with the datum coordinates. The engraving controller is connected to the image processor. The laser emitting member is connected to the engraving controller, and the engraving controller instructs the laser emitting member to engrave the workpiece based on a comparison of results between the engraving coordinates and the datum coordinates.

13 Claims, 2 Drawing Sheets

LASER ENGRAVING MECHANISM AND ENGRAVING METHOD OF USING THE SAME

BACKGROUND OF THE INVENTION

1. Field of the Invention

The present invention relates to laser engraving mechanisms and to an engraving method, and, particularly, to a laser engraving mechanism that can correct positioning errors automatically and to an engraving method of using the same.

2. Description of Related Art

Nowadays, laser engraving mechanisms are widely used for engraving characters, marks, and/or designs on workpieces. Generally, when a workpiece is engraved using a laser engraving mechanism, the workpiece is fixed in a holding fixture to get a high engraving precision. However, it costs more in resources and time in fabricating a high-precision holding fixture. Additionally, the holding fixture may be distorted during fabrication and/or worn in use, thus decreasing the engraving precision.

Therefore, a new laser engraving mechanism and a new engraving method are desired in order to overcome the above-described shortcomings.

SUMMARY

In one aspect, a laser engraving mechanism configured (i.e., structured and arranged) for engraving a workpiece includes an image receiver, an image processor, an engraving controller, and a laser emitting member. The image receiver screens the workpiece to form an image of the workpiece and transforms the image of the workpiece into electronic image signals. The image processor is connected to the image receiver. The image processor saves a group of datum coordinates and forms a group of engraving coordinates according to the electronic image signals and compares the engraving coordinates with the datum coordinates. The engraving controller is connected to the image processor. The laser emitting member is connected to the engraving controller, and the engraving controller instructs the laser emitting member to engrave the workpiece according to a comparison of results between the engraving coordinates and the datum coordinates.

In another aspect, a method of engraving a workpiece includes these steps:

providing a laser engraving mechanism, the laser engraving mechanism including an image receiver, an image processor being connected to the image receiver, an engraving controller being connected to the image processor, and a laser emitting member being connected to the engraving controller;

forming and saving a group of datum coordinates;

screening the workpiece to form an image of the workpiece;

transforming the image of the workpiece into electronic image signals;

forming a group of engraving coordinates according to the electronic image signals; comparing the engraving coordinates with the datum coordinates; and engraving the workpiece according results of the comparison between the engraving coordinates and the datum coordinates.

Other advantages and novel features will become more apparent from the following detailed description when taken in conjunction with the accompanying drawings.

BRIEF DESCRIPTION OF THE DRAWINGS

Many aspects of the present invention can be better understood with reference to the following drawings. The components in the various drawings are not necessarily drawn to scale, the emphasis instead being placed upon clearly illustrating the principles of the present laser engraving mechanism and method. Moreover, in the drawings, like reference numerals designate corresponding parts throughout the figures.

DETAILED DESCRIPTION OF THE INVENTION

Figure 1:
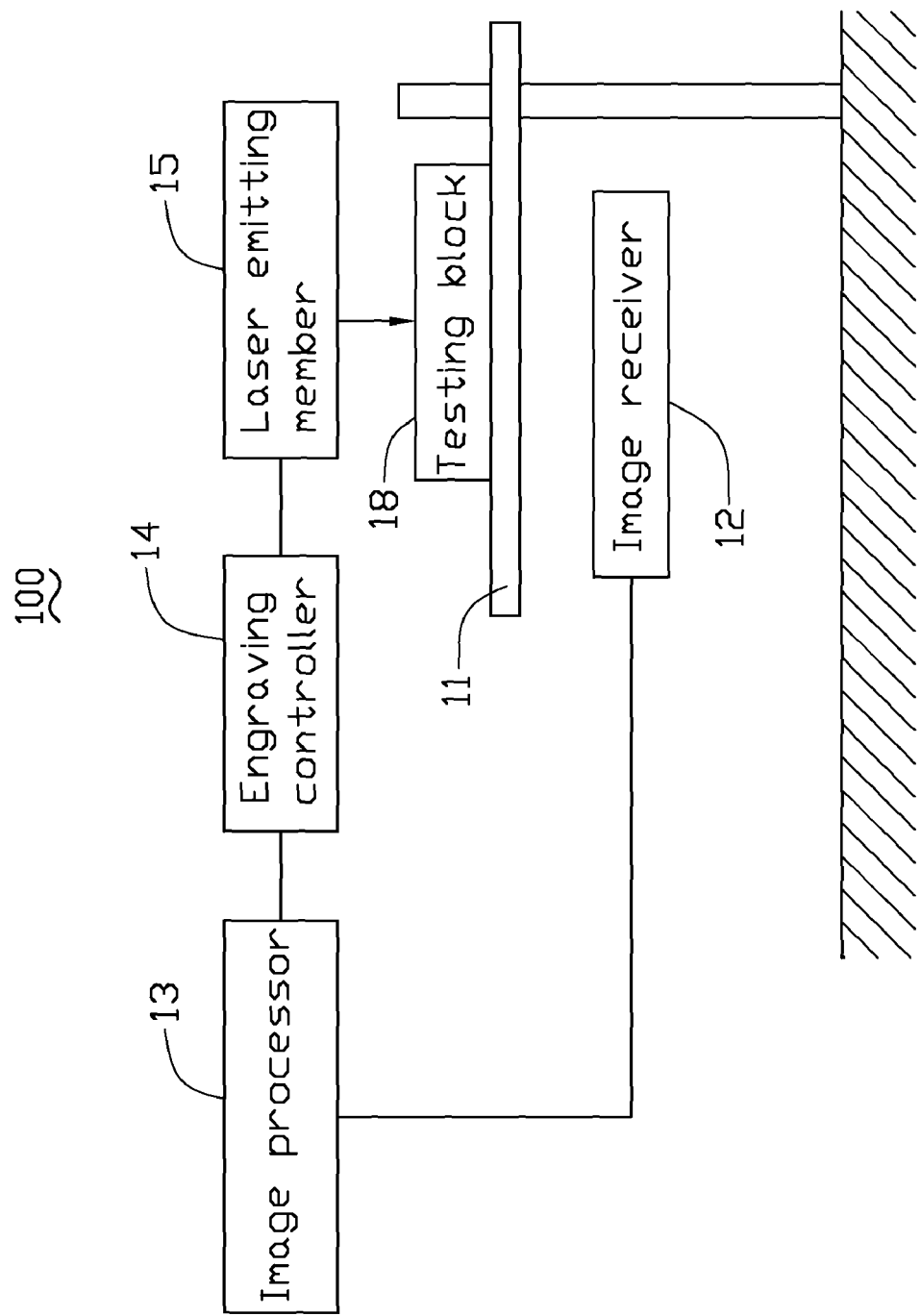
FIG. 1 is a schematic view of a laser engraving mechanism, in accordance with a preferred embodiment, being used for forming/collecting a group of datum coordinates.
Figure 2:
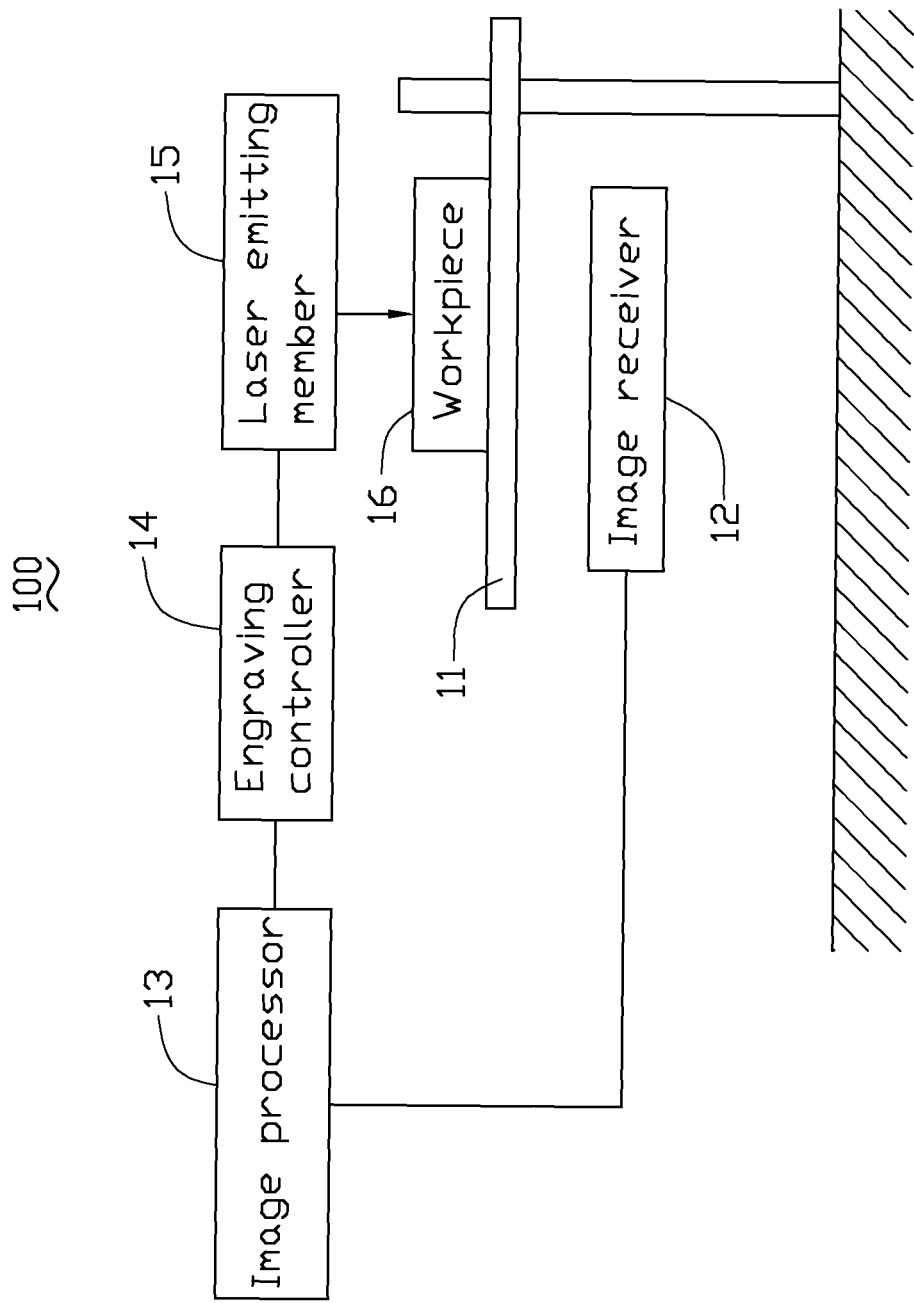
FIG. 2 is a schematic view of the laser engraving mechanism, shown in FIG. 1, used to engrave a workpiece.

FIG. 1 and FIG. 2 show a laser engraving mechanism 100 in accordance with a preferred embodiment. The laser engraving mechanism 100 is ultimately used to engrave a workpiece 16 and includes a worktable 11, an image receiver 12, an image processor 13, an engraving controller 14 and a laser emitting member 15. The image receiver 12 is electrically connected to the image processor 13. The engraving controller 14 is electrically connected to the image processor 13 and the laser emitting member 15.

The worktable 11 can fix the workpiece 16 on/at a proper place (i.e., position, location, orientation) in order to facilitate the engraving thereof. The image receiver 12 is, advantageously, a digital camera module that can screen (i.e., photograph) the workpiece 16 to form an image of the workpiece 16. The image receiver 12 can further transform the image screened/captured by the image receiver 12 into a group of electronic image signals. The electronic image signals corresponding to the image can then be transferred to the image processor 13.

The image processor 13 can form and save coordinates, and the image processor 13 can also compare different coordinates to calculate possible position errors. The engraving controller 14 is a processor that can control the laser emitting member 15. The laser emitting member 15 can emit laser light in a controllable manner (e.g., intensity, beam size, etc.) and is thereby configured for engraving the workpiece 16.

A method of using the laser engraver mechanism 100 to engrave the workpiece 16 includes these steps, as follows. Firstly, a group of datum coordinates, which serve as initializing or "baseline" data, are formed and saved by the image processor 13, the process by which such datum coordinates is gathered is elucidated here. Referring to FIG. 1, a testing block 18 having the same shape (i.e., dimensions, contour, etc.) as the workpiece 16 is placed in a proper place on the worktable 11. Further, the same characters, marks, and/or designs as those required to be engraved on the workpiece 16 are already engraved on corresponding places of the testing block 18, thereby serving as baseline or predetermined positions/locations for such engravings. Using the image receiver 12 to screen an image of the testing block 18, the image is transformed into a group of electronic image signals, and then such image signals are transferred to the image processor 13. The image processor 13 forms a group of datum coordinates according to the electronic image signals, and then stores the datum coordinates. In this way, the datum coordinates can be used to direct the laser emitting member 15 to engrave on/at proper positions/locations on the workpiece 16. That is, the datum coordinates together effectively act as an engraving map.

Secondly, referring to FIG. 2, the testing block 18 is taken away and the workpiece 16 is fixed at an appropriate place/position on the worktable 11. The image receiver 12 screens/captures an image of the workpiece 16 and transforms the image of the workpiece 16 into a group of electronic image signals. The electronic image signals corresponding to the image of the workpiece 16 are transferred to the image processor 13. The image processor 13 forms a group of engraving coordinates according to the electronic image signals transferred from the image receiver 12.

The image processor 13 adjusts the actual coordinates of the characters, marks, and/or designs engraved on the testing block 18 (i.e., to be engraved on the workpiece 16) to predetermined places/positions based on the saved datum coordinates by comparing the engraving coordinates with the datum (i.e., predetermined/baseline) coordinates and then accommodating any offset/differential therebetween. The engraving controller 14 instructs the laser emitting member 15 to engrave the workpiece 16 according to (i.e., based upon) results of a comparison between the engraving (i.e., actual) coordinates and the datum coordinates. If the engraving coordinates match with the datum coordinates, the image processor 13 transfers a working instruction to the engraving controller 14. The engraving controller 14 then instructs the laser emitting member 15 to emit laser light to engrave the workpiece 16 according to the engraving coordinates.

If, however, the engraving coordinates differ from the datum coordinates, the image processor 13 automatically calculates positioning errors of the engraving coordinates according to the datum coordinates (i.e., relative thereto). After the position errors are calculated, data of the position errors and the working instruction are transferred to the engraving controller 14. When the engraving controller 14 instructs the laser emitting member 15 to emit laser to engrave the workpiece 16 according to the engraving coordinates, it also instructs the laser emitting member 15 to move, as needed, to correct any such position errors.

Understandably, when a plurality workpieces 16 are engraved, only one group of datum coordinates needs to be formed and saved by the image processor 13. Because the laser engraving mechanism 100 corrects engraving position errors without moving the workpiece 16 and/or the worktable 11, it is easy to achieve high production rates.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A laser engraving mechanism configured for engraving a workpiece, the laser engraving mechanism comprising:
   an image receiver configured for screening a testing block and the workpiece before the workpiece is engraved in order to form images thereof and for transforming the images of the testing block and the workpiece into electronic image signals;
   an image processor connected to the image receiver, the image processor being configured for forming and storing a group of datum coordinates according to the electronic image signals of the testing block and for forming a group of engraving coordinates according to the electronic image signals of the workpiece before the workpiece is engraved, the image processor being configured for comparing the engraving coordinates with the datum coordinates;
   an engraving controller connected to the image processor; and
   a laser emitting member connected to the engraving controller, the engraving controller being configured for controlling the laser emitting member in a manner so as to engrave the workpiece based upon a comparison of results between the engraving coordinates and the datum coordinates.

2. The laser engraving mechanism as claimed in claim 1, wherein the laser engraving mechanism includes a worktable, the worktable being configured for fixing the workpiece at a proper place thereon in order to facilitate an engraving of the workpiece.

3. The laser engraving mechanism as claimed in claim 1, wherein the image receiver is a digital camera module.

4. The laser engraving mechanism as claimed in claim 1, wherein the image receiver is configured for transforming the image screened by the image receiver into a group of electronic image signals and for transferring the electronic image signals to the image processor.

5. A method of engraving a workpiece, comprising:
   providing a laser engraving mechanism, the laser engraving mechanism including an image receiver, an image processor, an engraving controller, and a laser emitting member, the image processor being connected to the image receiver, the engraving controller being connected to the image processor, the laser emitting member being connected to the engraving controller;
   screening a testing block to form an image thereof, and forming and saving a group of datum coordinates according to the image of the testing block;
   screening the workpiece to form an image of the workpiece;
   transforming the image of the workpiece into a group of electronic image signals;
   forming a group of engraving coordinates according to the electronic image signals;
   comparing the engraving coordinates with the datum coordinates; and
   engraving the workpiece based upon results of a comparison between the engraving coordinates and the datum coordinates.

6. The laser engraving method as claimed in claim 5, wherein the laser engraving mechanism includes a worktable, the worktable fixes the workpiece at a proper place thereon in order to facilitate the engraving of the workpiece.

7. The engraving method as claimed in claim 5, wherein the engraving controller instructs the laser emitting member to engrave the workpiece according to the comparison of results between the engraving coordinates and the datum coordinates.

8. The engraving method as claimed in claim 7, wherein when the engraving coordinates matches with the datum coordinates, the engraving controller instructs the laser emitting member emit laser light in a manner so as to engrave the workpiece according to the engraving coordinates.

9. The engraving method as claimed in claim 7, wherein when the engraving coordinates differs from the datum coordinates, the image processor calculates position errors of the engraving coordinates relative to the datum coordinates, and the engraving controller instructs the laser emitting member to move a proper offset to correct the positioning errors when the workpiece is engraved.

10. The engraving method as claimed in claim 5, wherein the image processor forms and saves the datum coordinates, forms the engraving coordinates according to the electronic image signals, and compares the engraving coordinates with the datum coordinates, the engraving coordinates corresponding to the actual engraving locations of at least one of a character, mark, and design to be engraved on the workpiece.

11. The engraving method as claimed in claim 10, wherein the group of datum coordinates corresponds to predetermined engraving locations of the at least one of a character, mark, and design as engraved on corresponding positions of the testing block.

12. The engraving method as claimed in claim 11, further including the step of adjusting the engraving coordinates for the at least one of a character, mark, and design to be engraved on the workpiece, the engraving coordinates being adjusted based upon the corresponding datum coordinates.

13. The engraving method as claimed in claim 12, wherein the testing block has the same shape as the workpiece.

* * * * *